United States Patent
Dawson

[19]

[11] Patent Number: 5,957,304
[45] Date of Patent: Sep. 28, 1999

[54] CROP HARVESTER

[75] Inventor: Christopher John Dawson, Strensall, United Kingdom

[73] Assignee: AGCO Limited, United Kingdom

[21] Appl. No.: 08/589,848

[22] Filed: Jan. 22, 1996

[30] Foreign Application Priority Data

Jan. 25, 1995 [GB] United Kingdom .................. 9501469
Sep. 15, 1995 [GB] United Kingdom .................. 9518903

[51] Int. Cl.⁶ ..................................................... B07C 5/00
[52] U.S. Cl. ............................................................ 209/552
[58] Field of Search ................................... 209/576, 577, 209/580, 657, 656; 56/10.2 A, 16.5; 364/423.098, 424.07

[56] References Cited

U.S. PATENT DOCUMENTS

| | | |
|---|---|---|
| 4,082,189 | 4/1978 | Cordes . |
| 4,410,091 | 10/1983 | Cowlin et al. . |
| 4,482,960 | 11/1984 | Pryor ...................................... 364/424 |
| 4,630,773 | 12/1986 | Ortlip . |
| 4,699,273 | 10/1987 | Suggi-Liverani et al. . |
| 4,994,970 | 2/1991 | Noji ................... 364/424.02 |
| 5,282,389 | 2/1994 | Faivre ................... 73/861.73 |
| 5,318,475 | 6/1994 | Schrock et al. . |
| 5,606,850 | 3/1997 | Nakamura ............... 56/10.2 A |

FOREIGN PATENT DOCUMENTS

| | | |
|---|---|---|
| 92 10 752 U | 12/1992 | Germany . |
| 262866 | 7/1926 | United Kingdom . |
| 946949 | 1/1964 | United Kingdom . |
| 1120628 | 7/1968 | United Kingdom . |
| WO 92/15192 | 9/1992 | WIPO . |

*Primary Examiner*—Robert J. Oberleitner
*Assistant Examiner*—C. T. Bartz
*Attorney, Agent, or Firm*—MacMillan, Sobanski & Todd, LLC

[57] ABSTRACT

A crop harvesting machine comprises two or more separate storage compartments (5a,5b) and a mechanism (6) for diverting harvested crop between the storage compartments as the machine moves across a field. The machine may also include a GPS positioning system and a control system (1) for controlling the diverter (6) on the basis of the machine's position and a map of harvesting instructions. The machine may in addition or alternatively include sensors (8) to analyse properties of the crop as it is harvested, enabling the control system (1) to control the diverter (6) accordingly.

8 Claims, 3 Drawing Sheets

PREDETERMINED MAP SHOWING EXAMPLE OF THREE ZONES WITHIN A FIELD FOR WHICH THE HARVESTED MATERIAL SHOULD BE STORED SEPARATELY

CROP HARVESTER

FIELD OF THE INVENTION

The present invention relates to apparatus for and methods of segregating crops at the point of harvest.

BACKGROUND TO THE INVENTION

Many machines used for harvesting agricultural and horticultural crops, whether grown for food stuff of for industrial purposes, include an on-board facility for temporarily storing the harvested material. This is almost invariably, but not exclusively, the case with combine harvesters which have a grain tank and which are used to harvest cereals, oil seeds, pulses and some other crops which similarly produce seed as the harvested product. Harvesters for other crops have this storage facility to a varying extent.

Combine harvesters with two or more discharge channels and a diversion mechanism serving several separate outlets are known from GB 946,949 (Claas). Furthermore, machines which can sort a crop once harvested are also known, examples being described in U.S. Pat. No. 4,669,273 (Suggi-Liverani et al) and U.S. Pat. No. 4,410,091 (Cowlin and Helsby). This sorting stage generally takes place as a separate operation post-harvesting with each harvested item being analysed and then segregated.

Recent research has shown that many of the factors which are known to affect characteristics such as the yield and quality of harvested crops vary both between fields and within fields to the extent that the yield and/or the quality of the harvested material can show significant spatial variability.

Recent developments also allow the position of a machine within a field or area to be spatially determined, for example using dead reckoning or by triangulated reference to remove transmitters or reflectors, including the use of the satellite-based global positioning system (GPS) or the like.

The knowledge of within-field variability and the associated variation in yield, combined with the ability to determine position accurately, has lead to the mapping of the variables and to the concept of "Precision Farming". To date this has generally involved the planning, and perhaps variation, of inputs such as fertilisers and agrochemicals according to field reserves of nutrients of the occurrence of patches of weeds, for example. This type of technique is described in U.S. Pat. No. 4,630,773 (Soil Teq). It has also lead to the variable management or treatment of a field according to a map of the spatial variability of the crop yield in order to maximise output.

It will be appreciated that none of the known devices or techniques enable a crop to be automatically harvested selectively on the basis of pre-determined date or on the basis of real-time analytical data obtained by analysing crop "on-the-go". The prior art known to the applicant is indeed directed to the maximisation of yield from a particular field and to the separate and/or sorting of a crop after harvest under the direct control of the operator.

It is an object of the present invention to provide a method of segregating a crop as it is harvested on a predetermined basis.

SUMMARY OF THE INVENTION

According to a first aspect of the present invention, in its broadest sense, there is provided a crop harvesting assembly for use on a crop harvesting machine comprising:

(a) a crop receiver for receiving the crop being harvested by the harvesting machine;

(b) a plurality of crop storage means;

(c) a diverter for selectively diverting the crop from the crop receiver to one of the said plurality of crop storage means;

(d) control means for controlling the operation of the diverter;

(e) discharge means for separately discharging the crop from each storage means;

characterised in that the control means is adapted to receive information from a global positioning system (GBP) or the like, this data being used either directly or indirectly to control the operation of the diverter.

Preferably, the control means is adapted to compare the position of the harvesting assembly with a predetermined map of harvesting instructions. This enables preharvest survey data to be used to direct the harvester to segregate the crop according to predetermined criteria.

Preferably, the assembly further comprises an analyser adapted to analyse one or more specific features of the crop, the results of said analysis being used directly or indirectly to control the operation of the diverter. In this way real time analytical data can be used to selectively control the gathering in of the crop against predetermined criteria.

Preferably the diverter may be controlled manually by the operator of the crop harvesting machine.

Preferably the assembly further comprises a logging device adapted to collect and record details of the harvest, including the spatial mapping of crop segregation.

This record can provide useful information for subsequent harvest.

According to a second aspect of the invention, there is provided a crop harvesting assembly for use on a crop harvesting machine comprising:

(a) a crop receiver for receiving the crop being harvested by the harvesting machine;

(b) a plurality of crop storage means;

(c) a diverter for selectively diverting the crop from the crop receiver to one of the said plurality of crop storage means;

(d) control means for controlling the operation of the diverter;

(e) discharge means for separately discharging the crop from each storage means;

characterised in that the assembly further comprises an analyser adapted to analyse one or more specific features of the crop, the results of said analysis being used directly or indirectly to control the operation of the diverter. In this way real time analytical data can be used to control the gathering in of the crop.

The control means may, in addition, be adapted to receive information from a global positioning system (GPS) or the like, this data being used together with the results of said analysis to control, directly or indirectly, the operation of the diverter. In this case, the control means is preferably also adapted to compare the position of the harvesting assembly with a pre-determined map of harvesting instructions.

Preferably, the diverter may also be controlled manually by the operator of the crop harvesting machine.

BRIEF DESCRIPTION OF THE DRAWINGS

Preferred embodiments of the present invention will now be more particularly described by way of example, with reference to the accompanying drawings wherein.

DESCRIPTION OF THE PREFERRED EMBODIMENTS

The embodiments described herein represent currently the best ways known to the applicant of putting the invention into practice. But they are not the only ways in which this could be achieved. They are illustrated, and they will now be described by way of example only.

Figure 1:
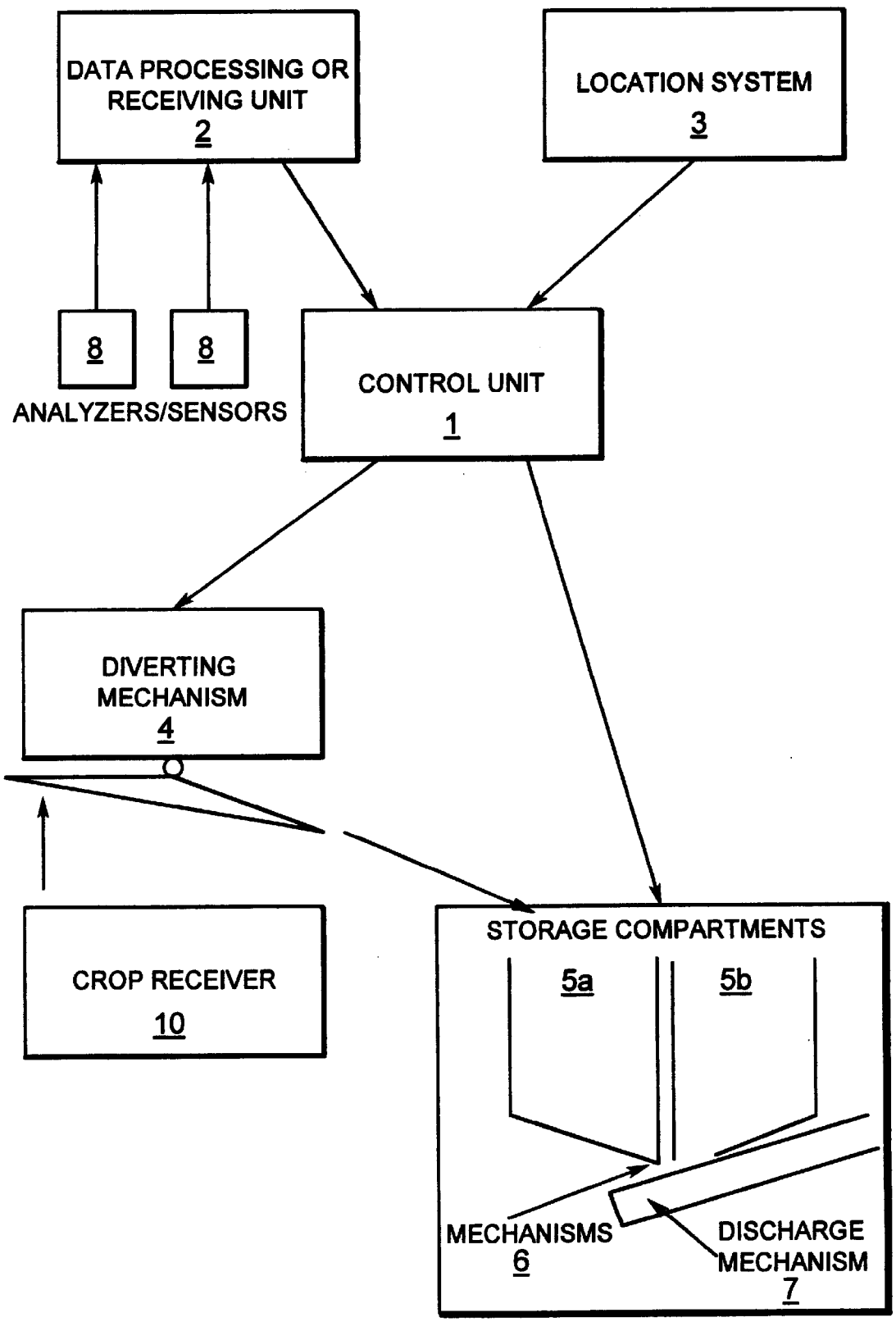
FIG. 1 shows schematically the components of a crop harvesting assembly according to the present invention.
Figure 2:
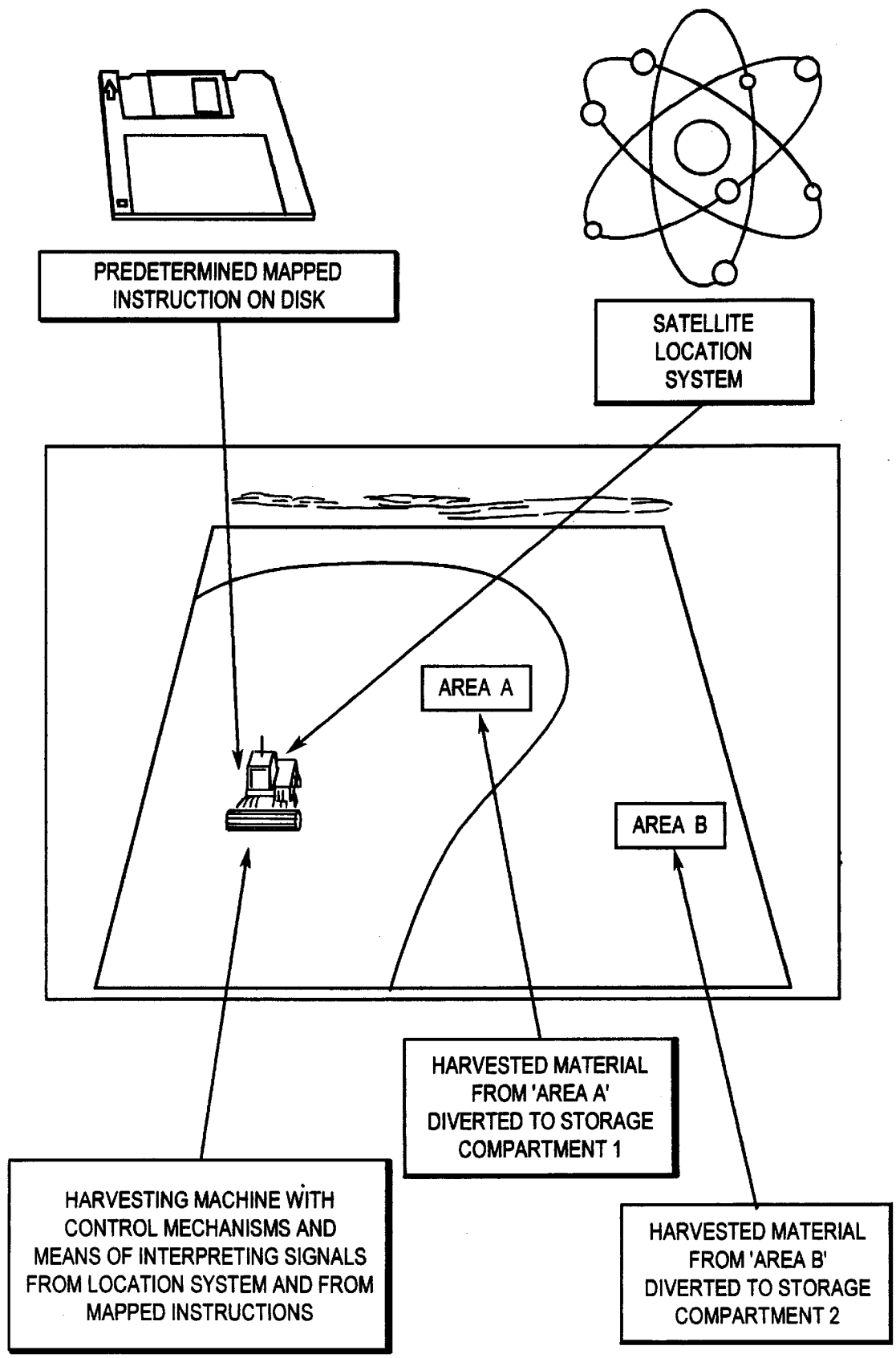
FIG. 2 illustrates diagrammatically on method of operation of a crop harvesting assembly.

Referring to the schematic diagram shown in FIG. 1, this shows a control unit 1 which acts a means for controlling a diverting mechanism 4 and, optionally, a discharge mechanism 7. The diverting mechanism is designed to selectively divert harvested crop from a crop reciever 10 into one or a plurality of storage compartments 5a, 5b etc.

Various inputs are provided into the control unit. For example, a location system 3 provides information on the position of the unit in relation to the area in which it is operating, typically a field. This location system can take a wide variety of forms. Typically it will be a GPS or equivalent unit since these are now both cheap, reliable and can pin-point position to within a few feet. However, this specification is intended to encompass other forms of position locating devices and methods such as dead reckoning or by triangulated reference to remote transmitters or reflectors, including other satellite-based systems.

Figure 3:
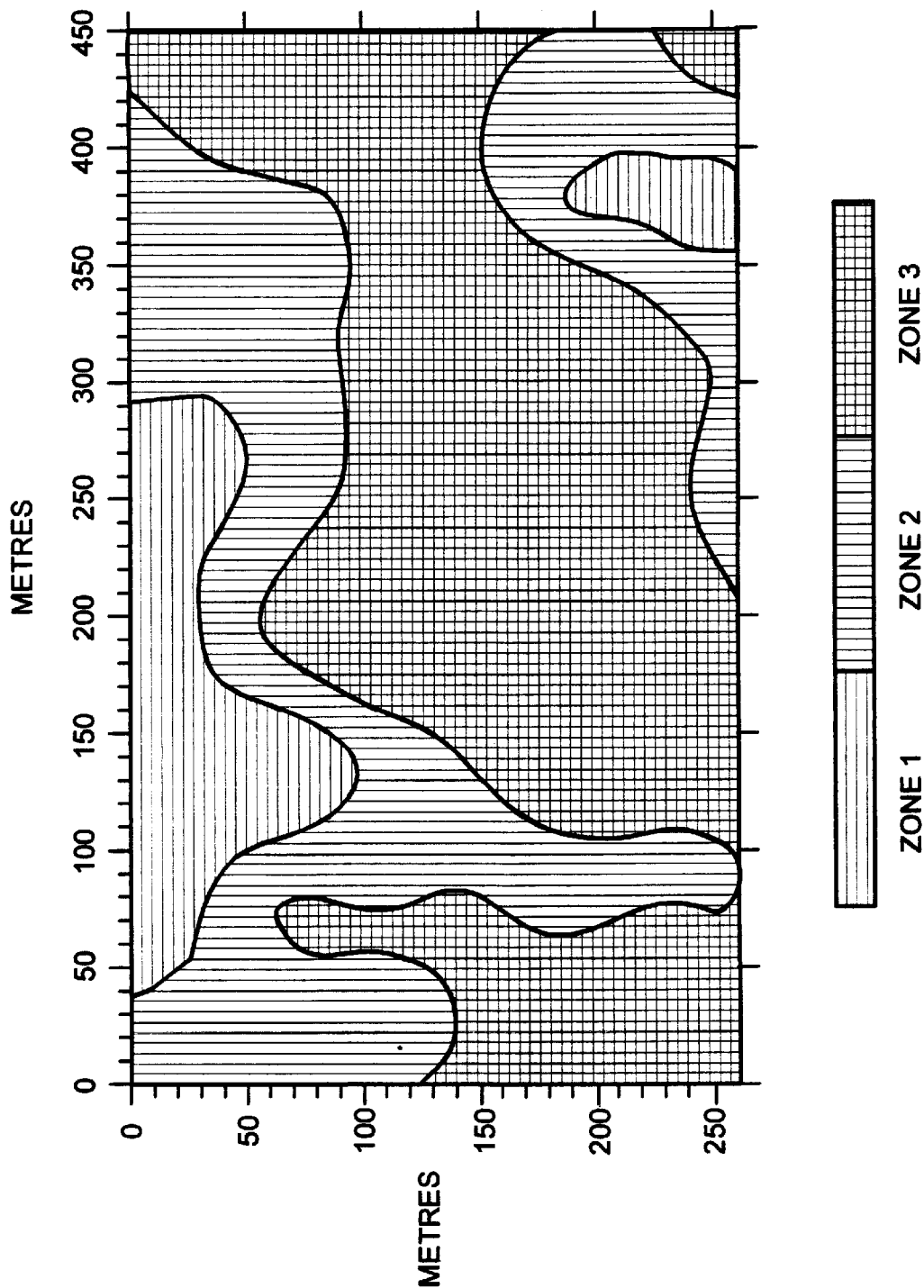
FIG. 3 illustrates a map showing three zones within a field for which the harvested material should be stored separately.

A data processing or receiving unit 2 may be provided and this may be integral with the control unit itself. This unit receives or provides data which the control unit can use to formulate the necessary instructions to control the diverter. For example, this data may be derived from a zoned map, eg a yield map, as illustrated in FIG. 3. The control unit 1 is capable of determining the position of the harvester in the field and following its course around the field. As it passes from one zone to another so the crop is diverted automatically into the appropriate storage compartment for that zone. Once an instructive map has been determined and used to programme the system, it is fully automatic. The operator simply drives the harvester back and forth across the field in the usual fashion and the crop is harvested continuously, the harvested material from each zone being separately and appropriately stored in zoned batches.

A manual override facility can also be included so that the operator can direct the crop into a compartment of his choice according to the conditions prevailing at the time.

It is also possible to segregate the crop on the basis of analytical data obtained by analysing the crop as it is being harvested. For example, sensors 8 can be provided to screen for water content, size, colour or some other feature of the crop upon which segregation is to be based. The analyser is thus one source of information for the control unit on the feature(s) of the crop being harvested which will determine whether or not the crop material will be stored separately from other crop material. This information may be obtained in a variety of ways. Sensors or measuring devices on the harvesting machine, for example a device for measuring the moisture content of the harvested material, may allow the crop to be separated according to this parameter. Similarly, other parameters such as colour, contamination by some extraneous or different material, nitrogen content, density or particle size may be automatically determined on the harvesting machine and become the basis of separate storage.

A further source of information is from predetermined data which may have been provided on the harvesting machine as, for example, electronically stored data, or may be transmitted to the harvesting machine as the harvesting operation proceeds. This predetermined information may be represented in the form of a map, as previously described in FIG. 3. This predetermined information will instruct the harvesting machine to divert the harvested material into different receivers and will usually relate to some known factor which will potentially affect some property of the harvested material. Such factors may include soil type or condition, shading from a wooded boundary, changes in crop variety, different weed, pest and/or disease control strategies practised within the field, test or experimental areas of a field, areas of expected high or low yield, nitrogen content, size, grade, maturity or other relevant parameter.

The control means can thus receive information from the analyser and combine it as necessary with other information received from which it is able to determine the position of the harvesting machine within the field. Thus if the information received from the analyser is predetermined, and is not in "real time" as would be the case for information from on-board sensors or the operator, then the control means relates the harvesting instructions to the position in the field and thus controls the diverter appropriately. While the control means can operate automatically according to predetermined instructions or following on-board analysis of some relevant parameter, it can also be operated manually by the operator of the harvesting machine.

When it is convenient to empty one or more of the storage compartments (5) each compartment may be emptied separately by means of a discharge mechanism (7) operating in conjunction with an auger or other crop conveying system. This mechanism ensures that materials stored separately on the harvesting machine can be transported separately from the field in which they were grown. The diverter (4) is capable of diverting harvested material directly into the discharge mechanism if so instructed, thereby by-passing any on-board storage means.

Once gathered by the machine, the crop will usually pass into some form of crop receiver. This may be a well-defined area, such as an intermediate holding area, or it may simple refer to the point at which the crop enters the machine. Alternatively, this term may relate to the pathway taken by the crop as it passes through the machine between the first entry point and arriving at the point at which it is diverted. As such, it may not be a clearly defined, isolatable entity.

This invention is intended to cover a harvesting machine, for example a combine harvester, which has on-board storage capacity for harvested material divided into a plurality of separate compartments of variable size. The compartments may be integral with or removable from the harvester, can be individually and separately filled and emptied. The filling system for these compartments is so arranged that it can divert harvested material into different compartments, or directly into the discharging facility, according to the instruction of the harvester operator or according to remote or predetermined instructions or according to instruction derived from on-board sensors. The decision to divert the harvested material into one or other of the compartments may relate to actual or expected differences between material harvested from different areas. Any predetermined instruction or decision may be mapped and may be carried on a recording device which may be mounted on the harvester or be remote from it. Any of the aforementioned actions, decisions or instructions may be taken or made with reference to a spatial location system which may be connected to or remote from the harvester, whereby the location of the harvester or crop area may be determined.

In a further aspect of the invention, the control unit is provided with a logging or recording facility to record the location of the harvester together with collection details of how the crop is being collected at various points. It is thus possible to create yield maps using this system of the type illustrated in FIG. 3. These maps may be used as a record, as a measure of performance against instructing criteria, and as instructions for collecting future harvests.

The precise details of the hardware and software necessary to put this invention into practice will form an inevitable part of the common general knowledge of the intended skilled addressee of this specification.

What I claim is:

1. A crop harvesting assembly for use on a crop harvesting machine, said assembly comprising:

(a) a crop receiver for receiving crop being harvested by said harvesting machine;

(b) a plurality of crop storage means;

(c) a diverter for selectively diverting crop from said crop receiver into one of said plurality of crop storage means;

(d) control means for controlling the operation of said diverter;

(e) discharge means for separately discharginng crop from each of said storage means;

(f) said control means being adapted to receive information from a positioning system, to compare the position of said harvesting assembly with a predetermined map of zones, each zone representing crop having a respective value range of a given property, and to control operation of said diverter based upon said map and the position of said harvesting assembly.

2. A crop harvesting assembly according to claim 1 wherein said control means includes means for comparing the position of said harvesting assembly with a predetermined map of harvesting instructions.

3. A crop harvesting assembly according to claim 1, comprising an analyzer for analyzing one or more specific features of crop, said control means being arranged to receive the results of said analysis and to control the operation of the diverter on the basis of said results.

4. A crop harvesting assembly according to claim 1, wherein said diverter is manually controllable by an operator of said crop harvesting machine.

5. A crop harvesting assembly for use on a crop harvesting machine comprising:

(a) a crop receiver for receiving crop being harvested by said harvesting machine;

(b) a plurality of crop storage means;

(c) a diverter for selectively diverting crop from said crop receiver into one of said plurality of crop storage means;

(d) control means for controlling the operation of said diverter;

(e) discharge means for separately discharging crop from each of said storage means;

said assembly further comprising an analyzer adapted to analyze one or more specific features of crop, said control means being adapted to receive the results of said analysis and to automatically control operation of said diverter on the basis of said results.

6. A crop harvesting assembly according to claim 5, wherein said control means is adapted to receive information from a positioning system, said information being used to control operation of said diverter.

7. A crop harvesting assembly as claimed in claim 6, said control means including means for comparing the position of said harvesting assembly with a predetermined map of harvesting instructions.

8. A crop harvesting assembly as claimed in claim 6, wherein said diverter is manually controllable by an operator of said crop harvesting machine.

* * * * *